Sept. 29, 1959 R. W. EMERY ET AL 2,906,889
BINARY TRIGGER CIRCUIT EMPLOYING SINGLE TRANSISTOR
Filed Dec. 31, 1953
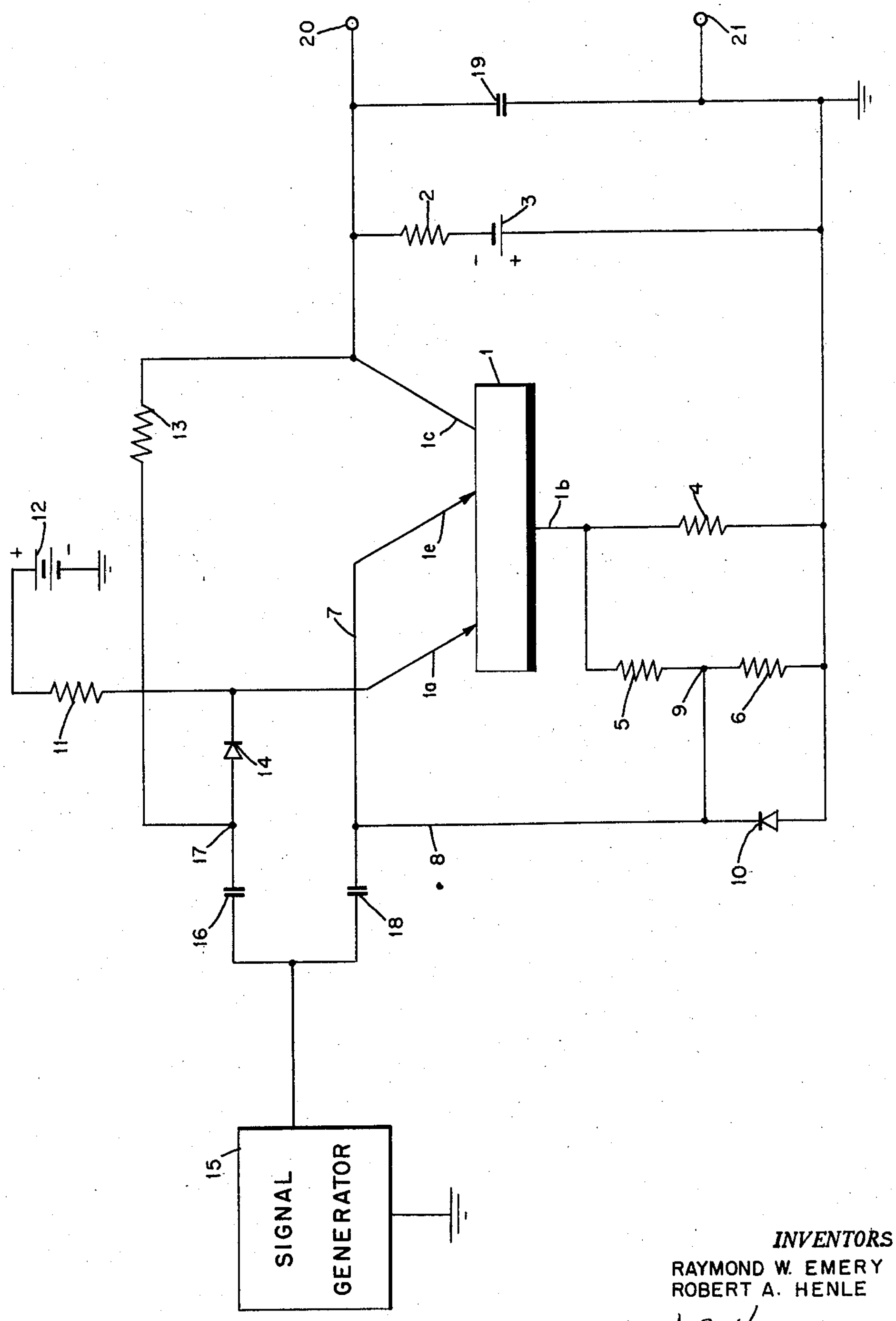
INVENTORS
RAYMOND W. EMERY
ROBERT A. HENLE
BY P. E. Henninger
ATTORNEY United States Patent Office
2,906,889
Patented Sept. 29, 1959

2,906,889

BINARY TRIGGER CIRCUIT EMPLOYING SINGLE TRANSISTOR

Raymond W. Emery, Poughkeepsie, and Robert A. Henle, Hyde Park, N.Y., assignors to International Business Machines Corporation, New York, N.Y., a corporation of New York Application December 31, 1953, Serial No. 401,644

10 Claims. (Cl. 307—88.5)

This invention relates to binary trigger circuits, and especially to binary trigger circuits employing transistors.

A binary trigger circuit may be defined as a circuit which produces a single output pulse upon receipt of the second of the two successive input pulses of the same polarity. In effect, the output pulses provide a binary count of the input pulses. A binary trigger circuit is to be distinguished from another type of trigger circuit which produces an output pulse upon receipt of successive input pulses of opposite polarities, and whose output pulses therefore do not necessarily provide a binary count of the input pulses.

Binary trigger circuits using transistors have previously been suggested. Typically, such circuits use two transistors. One of the transistors is turned on by the first pulse of a series and in turning on cuts off the second transistor and renders it sensitive to the following input pulse. The turning on of the second transistor by the following pulse is effective to cut off the first transitor and to produce an output pulse.

Attempts have been made to develop a binary trigger circuit using a single transistor, provided with means for steering successive input pulses alternately to the emitter and to the base, so that opposite effects would be obtained from alternate pulses. While such circuits have been built and operated, they have been rather critical in their operation with regard to the transistor characteristics. Reference is made to the article by Schultheiss and Reich entitled "Some Transistor Trigger Circuits," appearing on pages 627 to 632 of the June 1951 issue of the Proceedings of the Institute of Radio Engineers. In particular, as is pointed out in the Schultheiss and Reich article, such circuits have occasionally been reliable with one transistor and not with another, and on other occasions it has been observed that such a circuit would operate properly on one test and when next tested after a lapse of time would be ineffective.

An object of the present invention is to provide an improved binary trigger circuit using a single transistor.

Another object is to provide an improved binary trigger circuit using a single transistor and including improved means for switching or steering successive input pulses alternately to the emitter and to the base.

Another object is to provide an improved binary trigger circuit including a single transistor and improved positive feedback arrangements external to the transistor and insensitive to small variations in the transistor characteristics.

Another object of the invention is to provide an improved binary trigger circuit employing a three-whisker transistor of the type described and claimed in the copending application for patent of Richard F. Rutz, Serial #354,955, filed May 14, 1953, and entitled "Current Multiplication Transistors and Method of Producing Same." Such a transistor has a fourth electrode which functions as an auxiliary emitter.

The foregoing and other objects of the invention are attained, in the modification of the invention described herein, by the use of a transistor of the Rutz type, mentioned above. This transistor is connected in a circuit including an input which is connected through separate coupling capacitors to the emitter and to the base of the transistor. The base connection goes through the auxiliary emitter which is peculiar to the Rutz type of transistor. A feedback connection is provided between the collector and the auxiliary emitter so that the effectiveness of the signal supplied to the auxiliary emitter is varied depending upon the "on" or "off" condition of the transistor. A novel circuit for biasing the main emitter is provided, including a voltage divider supplied by two sources of electrical energy, whose polarities are opposed. One of the two sources is the battery which supplies the collector current. When that source predominates in sending current through the voltage divider, the emitter is biased positively and the transistor is "on." When the other source predominates, the emitter is biased negatively and the transistor is "off." A diode is provided bypassing a portion of the voltage divider when the transistor is "on" in order to reduce current losses in the voltage divider. A capacitor is connected across the output terminals to make the circuit less critical with respect to impedance values, etc.

Other objects and advantages of the invention will become apparent from a consideration of the appended specification and claims, taken together with the accompanying drawing.

In the drawing, the single figure represents a wiring diagram of a transistor circuit embodying the invention.

Referring to the drawing, there is shown a transistor 1 having a base electrode 1*b*, a collector electrode 1*c*, an emitter electrode 1*e* and an auxiliary emitter electrode 1*a*. The transistor is of the type shown and described in the Rutz application referred to above. It differs from conventional transistors in that the auxiliary emitter electrode, when biased positively, provides a source of excess current carriers for the semi-conductive body of the transistor and effectively increases the current amplification factor of the transistor.

In the following description of the circuit and its operation, certain values will be mentioned for the potentials of the various batteries and for the impedances of other circuit elements. It should be understood that these values are given by way of example only, and that the invention is not limited to these specific values.

The collector 1*c* is connected to ground through a resistor 2 and a battery 3. The base 1*b* is connected to ground through a resistor 4 and a pair of series resistors 5 and 6, connected in parallel with the resistor 4. The emitter 1*e* is connected through wires 7 and 8 to the junction 9 between the resistors 5 and 6. A diode or asymmetric impedance unit 10 is connected in parallel with resistor 6, being poled to pass current most readily in the direction from ground toward the emitter 1*e*.

The auxiliary emitter 1*a* is connected to ground through a resistor 11 and a battery 12. A resistor 13 and a diode 14 are connected in series between the collector 1*c* and auxiliary emitter 1*a*. A signal generator schematically indicated at 15 is connected through a capacitor 16 to the common terminal 17 between resistor 13 and diode 14. The signal generator 15 is also connected through a coupling capacitor 18 and wire 7 to the emitter 1*e*.

The resistors 5 and 6, hereinafter referred to as the voltage divider resistors, may receive current from the battery 3 and also may receive current from the battery 12. The polarity of battery 3 is such that current flowing from it tends to bias the base 1*b* negatively with respect to ground. On the contrary, the polarity of battery 12 is such that current flowing from it tends to bias the base 1*b* positively with respect to ground.

A capacitor 19 is connected between collector 1*c* and ground. This capacitor gives the circuit some short-time memory and makes the various impedance and potential values much less critical. Output terminals 20 and 21 are respectively connected to the collector 1c and to ground.

In one particular circuit embodying the invention, resistor 4 had a value of 1500 ohms, resistor 5 had a value of 12,000 ohms and resistor 6 had a value of 18,000 ohms. It will be readily recognized by those skilled in the art that the resistor 4 may be readily eliminated providing suitable adjustments are made in the values of resistors 5 and 6.

In said one particular circuit, the other batteries, resistors and capacitors had the values set forth in the following table.

| | | |
|---|---|---|
| Resistor **2** | ohms | 1,500 |
| Battery **3** | volts | 15 |
| Resistor **11** | ohms | 4,700 |
| Battery **12** | volts | 10–15 |
| Resistor **13** | ohms | 24,000 |
| Capacitor **16** | mmfd | 100 |
| Capacitor **18** | mmfd | 100 |
| Capacitor **19** | mmfd | 470 |

When the transistor 1 is "on" a substantial current is flowing from battery 3 through the base 1b and collector 1c, so that the polarity of junction 9 and hence of emitter 1e is positive with respect to the base, and the transistor is in a stable high output state. On the other hand, when the transistor is "off," the current through resistors 5 and 6 is supplied by battery 12, and the emitter 1e is biased negatively with respect to the base and the transistor is in a stable low output state.

Consider now the connection from the collector 1c to auxiliary emitter 1a through resistor 13 and diode 14. When the transistor is "off," the collector is substantially at the potential of the negative terminal of battery 3, while the auxiliary emitter 1a is at a positive potential determined by battery 12. The diode 14 is poled to block the flow of current through resistor 13 under such conditions. When the transistor is "on," the collector 1c is at a substantially more positive potential, but still lower than the potential of auxiliary emitter 1a. The difference between the collector potential and the auxiliary emitter potential at this time is, however, sufficiently small so that a positive input pulse transmitted through capacitor 16 is passed through the diode 14 and transmitted to the auxiliary emitter 1a.

*Operation*

Assume that the transistor is in its "off" or low output current condition, so that the collector 1c is then at substantially the potential of the negative terminal of battery 3. The junction 17 is at substantially the same potential, and since the other terminal of diode 14 is positive, substantially no current is flowing through it. The base 1b is at very nearly the same potential as the auxiliary emitter 1a. Current is flowing from the battery 12 through resistor 11, emitter 1a, base 1b and the resistors 4, 5 and 6 to ground. The emitter 1e, being connected to junction 9, is positive with respect to ground, but negative with respect to base 1b, so that the transistor is held cut off, with low collector current.

Under the foregoing conditions, assume that a positive potential signal pulse is received from the generator 15. This signal pulse passes through capacitor 18 and carries the emitter 1e positive with respect to the base. The same input pulse passes through capacitor 16 to junction 17, but that junction is biased sufficiently negatively by its connection to collector 1c through resistor 13 so that the input pulse is ineffective to pass through the diode 14. Consequently, the transistor shifts to its "on" condition when the positive impulse is received at emitter 1e.

Current then flows from battery 3 through resistors 4, 5 and 6, base 1b, collector 1c and resistor 2 back to the negative terminal of battery 3. This is the "on" condition of the transistor. The collector 1c is substantially more positive than it was during the "off" condition, by virtue of the potential drop across resistor 2, and the junction 17 follows the collector 1c to this more positive potential. The potential drop across the resistors 4, 5 and 6 is now in a direction to bias the emitter 1e positively with respect to the base.

The diode formed by the auxiliary emitter electrode 1a and the semi-conductive body of the transistor is always conducting so that the potential of auxiliary emitter 1a is somewhat more positive than the potential of base 1b.

The potential difference between collector 1c and ground appears across the output terminals 20 and 21.

With the transistor "on" as described above, assume that another positive signal impulse is received from generator 15. This impulse passes through capacitor 16, and is sufficiently large so that its potential added to that of the collector 1c at junction 17 carries that junction more positive than the right-hand terminal of diode 14, and the input signal passes on to the auxiliary emitter 1a, carrying that emitter positive, and tending to raise the potential of base 1b. The same input signal passes through capacitor 18 and wire 7 to emitter 1e where it similarly has a tendency to make the potential of base 1b more positive. The effects of the input signal at these two emitter electrodes is sufficient to carry the base 1b positive to substantially the same potential as the emitters 1a and 1e, thereby turning the transistor "off."

A certain amount of saturation effect is present here also. That is to say, the collector 1c is carrying substantially its maximum current, so that the current flow through it is not increased by the input signal passing through the capacitor 18.

The circuit described above has the battery polarities arranged for use with a transistor having an N-type semi-conductive body. It will be readily understood that the circuit can be modified to use a P-type semi-conductive body by reversing all battery and diode polarities.

While we have shown and described the preferred embodiments of our invention, other modifications thereof will readily occur to those skilled in the art, and we therefore intend our invention to be limited only by the appended claims.

We claim:

1. A binary trigger circuit comprising a transistor having a semi-conductive body, a base electrode, a collector electrode, and an emitter electrode, a first source of unidirectional electrical energy and a voltage divider connected in a first series circuit with the collector-base impedance of said transistor, said source being poled to send current through said collector-base impedance in its high impedance direction, a second source of unidirectional electrical energy connected in a second series circuit with said voltage divider with its polarity arranged so that it tends to send current through the voltage divider in a direction opposite to the current from said first source, and a connection between an intermediate point of the voltage divider and said emitter, said voltage divider and said connection being effective when said collector-base impedance is low and current is flowing through the voltage divider from said first source to hold said emitter electrode at a potential which maintains said collector substantially conductive, and effective when said collector-base impedance is high and the current is flowing through the voltage divider from said second source to hold said emitter electrode at a potential relative to the base which maintains said collector substantially non-conductive.

2. A binary trigger circuit as defined in claim 1, including an asymmetric conductive element connected between said emitter and one end of said voltage divider and forming a low impedance path for emitter current when said collector is conductive.

3. A binary trigger circuit comprising a transistor having a semi-conductive body, a base electrode, a collector electrode, a main emitter electrode, and an auxiliary emitter electrode, a first source of electrical energy and a voltage divider connected in series between the collector and the base, a second source of electrical energy connected in series with said voltage divider between the auxiliary emitter electrode and the base, said sources of electrical energy having their polarities opposed and thereby tending to cause current flows through said voltage divider in opposite directions, a connection between an intermediate point of said voltage divider and said main emitter electrode, said voltage divider and said connection being effective when current is flowing through the voltage divider, base and collector from said first source to hold said main emitter electrode at a potential which maintains said collector substantially conductive, and effective when current is flowing through the base and voltage divider from said second source to hold said main emitter electrode at a potential relative to the base which maintains said collector substantially non-conductive.

4. A binary trigger circuit comprising a transistor having a semi-conductive body, a base electrode, a collector electrode, a main emitter electrode, and an auxiliary emitter electrode, a first source of electrical energy and a voltage divider connected in series between the collector and the base, a second source of electrical energy connected in series with said voltage divider between the auxiliary emitter electrode and the base, said sources of electrical energy having their polarities opposed and thereby tending to cause current flows through said voltage divider in opposite directions, a connection between an intermediate point of said voltage divider and said main emitter electrode, said voltage divider and said connection being effective when current is flowing through the voltage divider, base and collector from said first source to hold said main emitter electrode at a potential which maintains said collector substantially conductive, and effective when current is flowing through the base and voltage divider from said second source to hold said main emitter electrode at a potential relative to the base which maintains said collector substantially non-conductive, an input signal generator adapted to produce signal pulses of a proper polarity to render said collector conductive when applied to the main emitter, first coupling means for transmitting pulses from the generator to the main emitter, said main emitter being effective upon receipt of a pulse through said coupling means while the collector is non-conductive to render said collector conductive, a diode and a resistor connected in series between said auxiliary emitter and said collector, said diode being poled to block the flow of current between said first and second sources, and second coupling means for transmitting pulses from the generator to the common terminal of said diode and said resistor, said diode and said auxiliary emitter being effective upon receipt of a pulse through said second coupling means while the collector is conductive to vary the potential of the base relative to the main emitter in a sense to render the collector non-conductive, said main emitter being insensitive to signal pulses due to saturation when the collector is conductive, said resistor being effective when the collector is non-conductive to shunt signal pulses from said auxiliary emitter.

5. A binary trigger circuit comprising a single transistor having a semi-conductive body, a base electrode, a collector electrode, and an emitter electrode; an output loop circuit including a source of electrical energy, feedback impedance means, said base electrode, the base-to-collector impedance of said semi-conductive body, said collector electrode, and a load resistor, all connected in series; a single pair of signal input terminals, first input signal coupling means including a first coupling capacitor connected between one of said terminals and said emitter electrode, second input signal coupling means including a second coupling capacitor connected between said one terminal and said base electrode; a voltage divider connected in said feedback impedance means to carry at least a portion of the current in said output loop circuit, means connecting an intermediate point on said divider to said emitter electrode and cooperating with said output loop circuit to render said first coupling means ineffective to transmit input signals when said output loop circuit is carrying a substantial current and to render said first coupling means effective to transmit input signals when said output loop circuit is carrying substantially no current, and means including a diode in said second coupling means and a resistor connected between said collector electrode and one terminal of said diode and cooperating with said output loop circuit to render said second coupling means ineffective to transmit input signals when said output loop circuit is carrying substantially no current and to render said second coupling means effective to transmit input signals when said output loop circuit is carrying a substantial current.

6. A binary trigger circuit as defined in claim 5, in which said second coupling means comprises an auxiliary emitter electrode on said transistor.

7. A binary trigger circuit comprising a single transistor having a semiconductive body, a base electrode, a collector electrode, and an emitter electrode, a source of input signals having a polarity such that when the signals are applied to the emitter electrode they tend to increase the current flow through the transistor and when the signals are applied to the base electrode they tend to decrease the current flow through the transistor, first coupling means for conducting signals from said source to the emitter electrode, and second coupling means for selectively conducting input signals from said source to the base electrode when the collector is substantially conductive and blocking said input signals from the base electrode when the collector is substantially non-conductive, said second coupling means including a diode, and means for transmitting the potential of the collector to one terminal of the diode, said transmitting means being effective only when the collector is substantially non-conductive to bias the diode reversely by an amount sufficient to block said input signals.

8. A binary trigger circuit as defined in claim 7, in which said transmitting means includes a resistor.

9. A binary trigger circuit as defined in claim 7, including a source of fixed potential and means conductively connecting the other terminal of the diode to said source of fixed potential, so that the variation of the collector potential controls the bias potential across the diode.

10. A binary trigger circuit as defined in claim 7, in which said second coupling means comprises an auxiliary emitter electrode on said transistor and connected between said diode and said base.

References Cited in the file of this patent

UNITED STATES PATENTS

| | | |
|---|---|---|
| 2,476,323 | Rack | July 19, 1949 |
| 2,569,345 | Shea | Sept. 25, 1951 |
| 2,629,834 | Trent | Feb. 24, 1953 |
| 2,644,896 | Lo | July 7, 1953 |
| 2,655,607 | Reeves | Oct. 13, 1953 |
| 2,666,150 | Blakely | Jan. 12, 1954 |
| 2,676,271 | Baldwin | Apr. 20, 1954 |
| 2,724,061 | Emery | Nov. 15, 1955 |
| 2,747,111 | Koch | May 22, 1956 |